US011460591B2

United States Patent
Sasaki

(10) Patent No.: US 11,460,591 B2
(45) Date of Patent: Oct. 4, 2022

(54) RADIATION IMAGING APPARATUS COMPRISING A BIAS POWER SUPPLY, A PROCESSING UNIT, AND A DRIVE CONTROL UNIT, METHOD OF CONTROLLING THE RADIATION IMAGING APPARATUS, AND RADIATION IMAGING SYSTEM

(71) Applicant: CANON KABUSHIKI KAISHA, Tokyo (JP)

(72) Inventor: Hiroshi Sasaki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 140 days.

(21) Appl. No.: 16/823,585

(22) Filed: Mar. 19, 2020

(65) Prior Publication Data
US 2020/0309965 A1 Oct. 1, 2020

(30) Foreign Application Priority Data
Mar. 29, 2019 (JP) .............................. JP2019-068563

(51) Int. Cl.
*G01T 1/24* (2006.01)
*G01T 1/175* (2006.01)
(Continued)

(52) U.S. Cl.
CPC ................ *G01T 1/24* (2013.01); *G01T 1/172* (2013.01); *G01T 1/175* (2013.01); *G01T 1/20* (2013.01);
(Continued)

(58) Field of Classification Search
CPC ....... A61B 6/42; A61B 6/4208; A61B 6/4233; A61B 6/4241; A61B 6/4283; A61B 6/52;
(Continued)

(56) References Cited

U.S. PATENT DOCUMENTS 6,797,960 B1 * 9/2004 Spartiotis ................. H04N 5/32
250/370.09
7,211,803 B1 * 5/2007 Dhurjaty ................. G01T 1/247
250/370.08
(Continued)

FOREIGN PATENT DOCUMENTS

| JP | 2002-543684 | 12/2002 |
| JP | 2014-168203 | 9/2014 |
| WO | 00/065825 | 11/2000 |

*Primary Examiner* — Allen C. Ho
(74) *Attorney, Agent, or Firm* — Venable LLP

(57) ABSTRACT

A radiation imaging apparatus includes a pixel array, a bias line, a plurality of drive lines, and a driving unit configured to cyclically supply an ON voltage to the drive lines. The radiation imaging apparatus also includes an acquiring unit configured to acquire a plurality of signal values by acquiring a signal value representing a current flowing through the bias line at each of a plurality of times within a period in which the ON voltage is continuously supplied to at least one of the plurality of drive lines, and a processing unit configured to specify an outlier in the plurality of signal values and determine whether or not there is a radiation irradiation with respect to the pixel array based on a signal value among the plurality of signal values that is not an outlier, and without being based on the outlier.

12 Claims, 7 Drawing Sheets

(51) Int. Cl.
 *G01T 1/172* (2006.01)
 *G01T 1/20* (2006.01)
 *H04N 5/32* (2006.01)

(52) U.S. Cl.
 CPC .......... *G01T 1/2006* (2013.01); *G01T 1/2018*
 (2013.01); *G01T 1/20184* (2020.05); *G01T*
 *1/246* (2013.01); *G01T 1/247* (2013.01); *H04N*
 *5/32* (2013.01)

(58) Field of Classification Search
 CPC ....... A61B 6/5258; A61B 6/5294; A61B 6/54;
  A61B 6/542; A61B 6/545; A61B 6/58;
  A61B 6/582; A61B 6/585; G01T 1/20;
  G01T 1/2006; G01T 1/2018; G01T
  1/20184; G01T 1/24; G01T 1/246; G01T
  1/247
 USPC ...................... 378/91, 98.8, 207; 250/370.09
 See application file for complete search history.

(56) References Cited

U.S. PATENT DOCUMENTS

| | | | | |
|---|---|---|---|---|
| 8,415,636 B2 * | 4/2013 | Sato | .......................... | H04N 5/32 250/370.09 |
| 8,476,597 B2 * | 7/2013 | Kuwabara | ............. | G01T 1/2018 250/371 |
| 8,536,535 B2 * | 9/2013 | Amitani | .................... | H04N 5/32 250/370.09 |
| 8,558,186 B2 * | 10/2013 | Kondou | .................... | H04N 5/32 250/370.09 |
| 8,642,970 B2 * | 2/2014 | Iwakiri | .................... | G01T 1/247 250/370.08 |
| 8,664,615 B2 * | 3/2014 | Amitani | ................ | A61B 6/4283 250/370.09 |
| 8,705,700 B2 * | 4/2014 | Eguchi | ................. | H04N 5/3698 378/116 |
| 8,750,455 B2 * | 6/2014 | Kondou | ................... | H04N 5/32 378/98.8 |
| 8,785,871 B2 * | 7/2014 | Muraoka | .................. | H04N 5/32 250/370.09 |
| 8,866,095 B2 * | 10/2014 | Oguma | ................ | A61B 6/4283 250/370.11 |
| 8,872,118 B2 * | 10/2014 | Nishino | .................... | H04N 5/32 250/370.09 |
| 8,952,335 B2 * | 2/2015 | Sato | .......................... | G01T 1/247 250/370.09 |
| 9,241,116 B2 * | 1/2016 | Kameshima | .............. | G01T 1/17 |
| 9,322,928 B2 * | 4/2016 | Iwakiri | ................ | A61B 6/4233 |
| 9,329,280 B2 * | 5/2016 | Kameshima | .............. | G01T 1/16 |
| 9,335,422 B2 * | 5/2016 | Oda | ........................ | A61B 6/548 |
| 9,351,699 B2 * | 5/2016 | Kuwabara | ............... | A61B 6/542 |
| 9,360,562 B2 * | 6/2016 | Sato | ........................ | A61B 6/544 |
| 9,417,333 B2 * | 8/2016 | Sato | ........................ | G01T 1/17 |
| 9,423,512 B2 * | 8/2016 | Sato | ........................ | H04N 5/32 |
| 9,462,989 B2 * | 10/2016 | Takenaka | ................. | H04N 5/32 |
| 9,462,990 B2 * | 10/2016 | Kuwabara | ................ | A61B 6/54 |
| 9,470,800 B2 | 10/2016 | Iwashita et al. | | |
| 9,470,802 B2 * | 10/2016 | Okada | .................... | H04N 5/361 |
| 9,513,379 B2 * | 12/2016 | Nishino | ................... | A61B 6/548 |
| 9,521,987 B2 * | 12/2016 | Tajima | .................... | A61B 6/547 |
| 9,541,653 B2 * | 1/2017 | Iwashita | ................... | G01T 1/17 |
| 9,569,829 B2 * | 2/2017 | Ohguri | .................... | A61B 6/582 |
| 9,579,076 B2 * | 2/2017 | Tajima | .................... | A61B 6/4291 |
| 9,629,601 B2 * | 4/2017 | Tajima | ................. | A61B 6/4291 |
| 9,649,086 B2 * | 5/2017 | Tajima | ................. | A61B 6/4233 |
| 9,750,477 B2 * | 9/2017 | Kitagawa | .............. | G01T 1/2018 |
| 9,753,159 B2 * | 9/2017 | Iwakiri | ............ | H01L 27/14609 |
| 9,780,128 B2 * | 10/2017 | Tajima | ............... | H01L 27/14603 |
| 9,782,144 B2 * | 10/2017 | Kuwabara | ........... | A61B 6/4233 |
| 9,787,919 B2 * | 10/2017 | Kuwabara | ................ | A61B 6/44 |
| 9,788,809 B2 * | 10/2017 | Hiroike | .................... | A61B 6/54 |
| 9,793,305 B2 * | 10/2017 | Tajima | .................... | H05G 1/28 |
| 9,826,946 B2 * | 11/2017 | Ota | ........................ | A61B 6/107 |
| 9,848,845 B2 * | 12/2017 | Tajima | .................... | A61B 6/542 |
| 9,880,111 B2 * | 1/2018 | Oda | ........................ | A61B 6/4283 |
| 9,892,521 B2 * | 2/2018 | Enomoto | .................. | G06T 7/30 |
| 9,910,169 B2 * | 3/2018 | Iwashita | ................... | G01T 1/29 |
| 9,931,092 B2 * | 4/2018 | Tajima | .................... | A61B 6/488 |
| 9,967,962 B2 * | 5/2018 | Imamura | ................. | H05G 1/40 |
| 9,971,046 B2 * | 5/2018 | Ryu | ..................... | G01T 1/247 |
| 9,977,135 B2 * | 5/2018 | Yokoyama | ........... | A61B 6/4233 |
| 10,022,102 B2 * | 7/2018 | Okada | ................... | G01N 23/04 |
| 10,180,501 B2 * | 1/2019 | Iizuka | .................... | H04N 5/32 |
| 10,206,642 B2 * | 2/2019 | Hiroike | ................... | A61B 6/54 |
| 10,209,370 B2 * | 2/2019 | Sato | ........................ | G01T 1/175 |
| 10,251,616 B2 * | 4/2019 | Maruta | ................ | A61B 6/4283 |
| 10,288,747 B2 * | 5/2019 | Tamura | ................ | H04N 5/3765 |
| 10,470,727 B2 * | 11/2019 | Ota | ........................ | A61B 6/54 |
| 10,470,737 B2 * | 11/2019 | Iijima | ........................ | A61B 6/54 |
| 10,473,801 B2 * | 11/2019 | Kawanabe | ............. | H04N 5/378 |
| 10,492,748 B2 * | 12/2019 | Nonaka | ................ | A61B 6/4266 |
| 10,539,692 B2 * | 1/2020 | Kosuge | ..................... | H04N 5/32 |
| 10,551,721 B2 * | 2/2020 | Sato | ........................ | G03B 7/08 |
| 10,605,747 B2 * | 3/2020 | Ubukata | ................ | A61B 6/548 |
| 10,716,522 B2 * | 7/2020 | Sato | ........................ | H04N 5/3696 |
| 10,722,199 B2 * | 7/2020 | Hiroike | ................ | A61B 6/4233 |
| 10,788,592 B2 * | 9/2020 | Koeda | ..................... | G01T 1/247 |
| 10,854,663 B2 * | 12/2020 | Takenaka | ................. | H04N 5/363 |
| 10,914,849 B2 * | 2/2021 | Ofuji | ...................... | G01T 1/247 |
| 11,016,203 B2 * | 5/2021 | Iwakiri | ................ | G01T 1/2018 |
| 11,047,994 B2 * | 6/2021 | Terui | .................... | H04N 5/3205 |
| 11,243,313 B2 * | 2/2022 | Takenaka | ............ | G01T 1/20181 |
| 11,252,349 B2 * | 2/2022 | Kosuge | ................... | H04N 5/378 |
| 11,280,919 B2 * | 3/2022 | Takenaka | ................. | G01T 1/2018 |
| 11,303,831 B2 * | 4/2022 | Iwashita | ............ | H04N 5/37452 |

* cited by examiner

F I G. 1
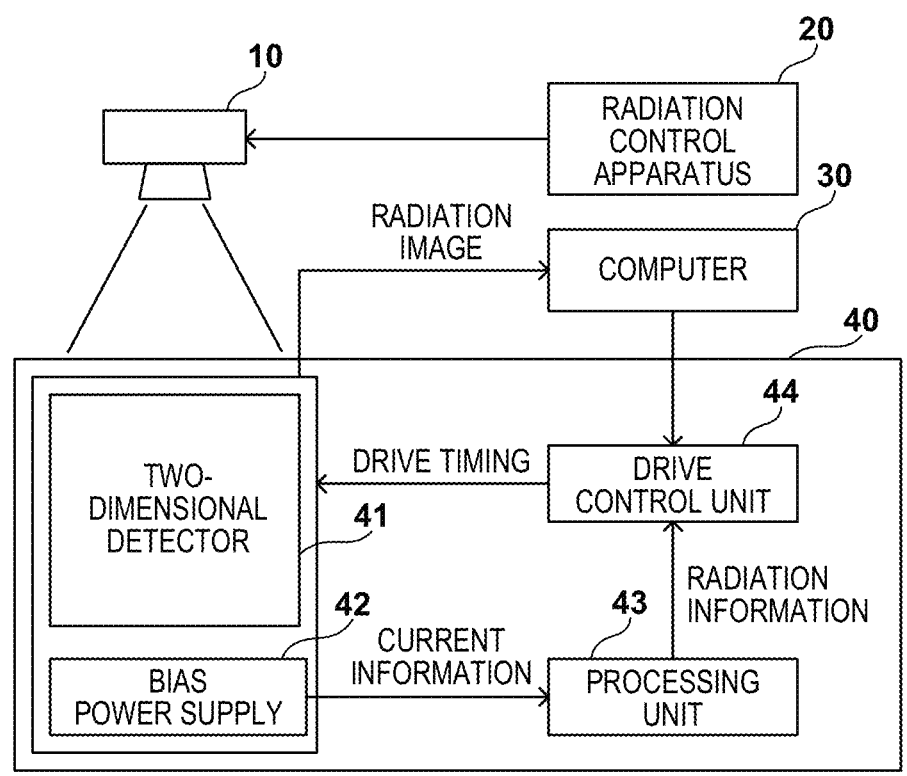

RADIATION IMAGING APPARATUS COMPRISING A BIAS POWER SUPPLY, A PROCESSING UNIT, AND A DRIVE CONTROL UNIT, METHOD OF CONTROLLING THE RADIATION IMAGING APPARATUS, AND RADIATION IMAGING SYSTEM

BACKGROUND OF THE INVENTION

Field of the Invention

The present invention relates to a radiation imaging apparatus, a method of controlling the same, and a radiation imaging system

Description of the Related Art

In order to achieve synchronization between a radiation generating apparatus and a radiation imaging apparatus, a configuration has been proposed in which the radiation imaging apparatus detects the presence or absence of radiation irradiation. Japanese Patent Laid-Open No. 2002-543684 proposes a radiation imaging apparatus that detects the presence or absence of radiation irradiation by utilizing a current flowing through a bias line that supplies a bias potential to a pixel when the radiation imaging apparatus is irradiated with radiation. More specifically, when the current flowing through the bias line exceeds a predetermined threshold value, it is determined that radiation is being irradiated. A noise current flows through the bias line due to various factors other than a current caused by radiation. In the case where the noise current is large, even if the radiation imaging apparatus is not irradiated with the radiation, it may be erroneously detected that the radiation imaging apparatus has been irradiated. To prevent erroneous detection, Japanese Patent Laid-Open No. 2002-543684 includes a sample-and-hold circuit for holding a dark current flowing through the bias line, and compares a value, which is obtained by subtracting the held dark current from a current flowing through the bias line at a certain point in time, with a threshold value. In addition, in Japanese Patent Laid-Open No. 2014-168203, noise mixed in the bias current is removed by obtaining a difference between a current flowing in the bias line while a switch element of the pixel of the radiation imaging apparatus is in a conductive state and a current flowing in the bias line while the switch element is non-conductive.

SUMMARY OF THE INVENTION

The method proposed in the Japanese Patent Laid-Open No. 2002-543684 to reduce dark current can only remove noise having a very low frequency component (e.g., less than 1 Hz) as with temperature drift of the bias current. The method of obtaining the difference between the current at the time of conduction and the current at the time of non-conduction of the switch element proposed in the Japanese Patent Laid-Open No. 2014-168203 can remove noise (50 to 60 Hz) mixed from a commercial power supply and noise (several Hz to several kHz) generated when pressure or an impact is applied to the housing. However, this method cannot remove high-frequency noise such as noise caused by static electricity (several MHz to several GHz). Such high-frequency noise may cause erroneous detection of radiation irradiation. One aspect of the present invention provides a technique for reducing erroneous detection associated with radiation irradiation with respect to a radiation imaging apparatus.

According to an embodiment, a radiation imaging apparatus comprising: a pixel array in which a plurality of pixels each including a conversion element for converting radiation into electric charge and a switch element for connecting the conversion element to a signal line are arranged to configure a plurality of rows and a plurality of columns; a bias line for applying a bias potential to each conversion element of the plurality of pixels; a plurality of drive lines for respectively supplying, to a control terminal of each switch element of the plurality of pixels, an ON voltage for turning on the switch element; a driving unit configured to cyclically supply the ON voltage to the plurality of drive lines; an acquiring unit configured to acquire a plurality of signal values by acquiring a signal value representing a current flowing through the bias line at each of a plurality of times within a period in which the ON voltage is continuously supplied to at least one of the plurality of drive lines; and a processing unit configured to specify an outlier in the plurality of signal values and determine whether or not there is radiation irradiation with respect to the pixel array based on a signal value among the plurality of signal values that is not an outlier, and without being based on a signal value specified as an outlier among the plurality of signal values is provided.

Further features of the present invention will become apparent from the following description of exemplary embodiments (with reference to the attached drawings).

BRIEF DESCRIPTION OF THE DRAWINGS

FIG. 1 is a diagram for describing a configuration example of a radiation imaging system according to a first embodiment.

DESCRIPTION OF THE EMBODIMENTS

Figure 2:
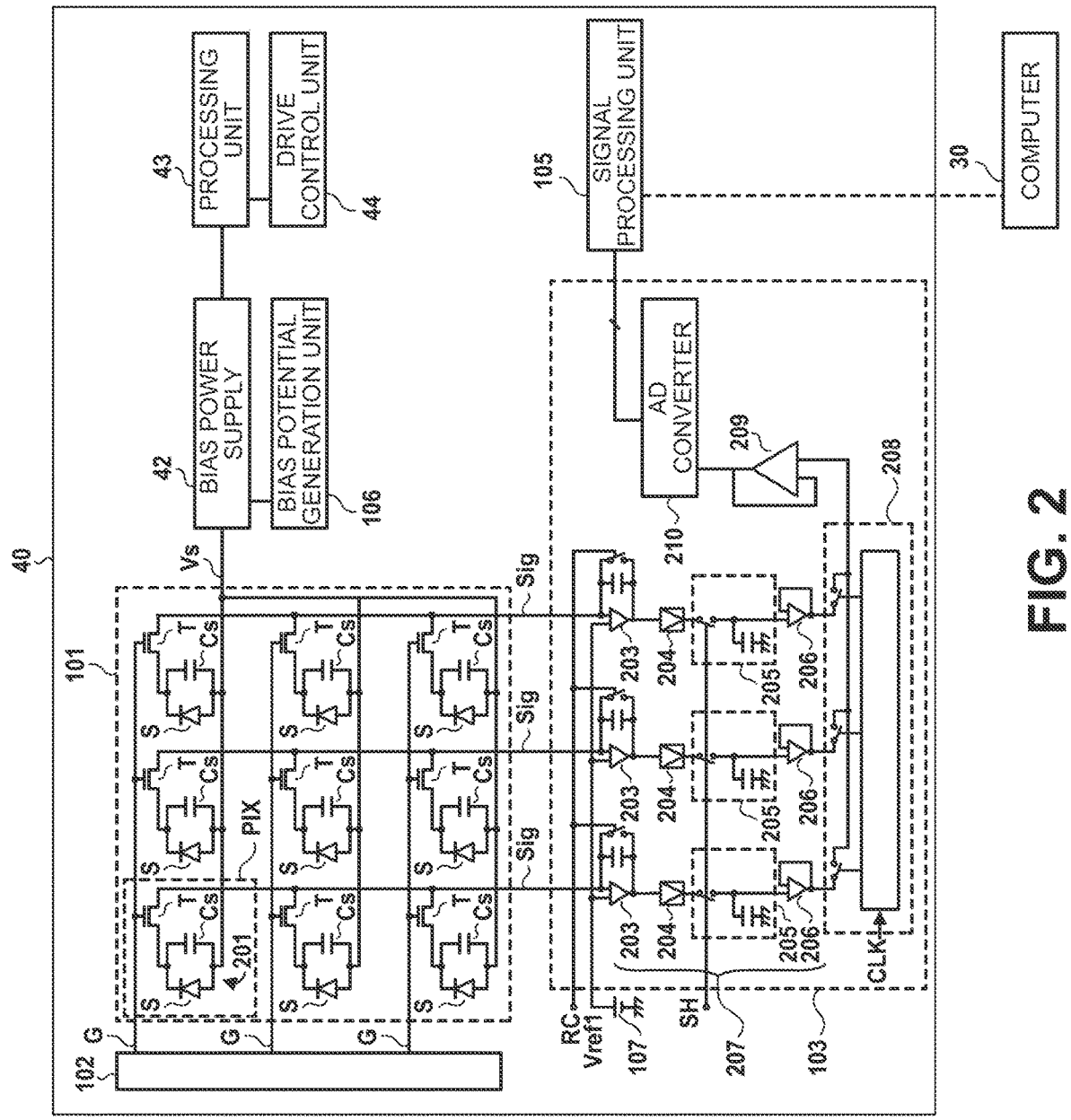
FIG. 2 is a diagram for describing a configuration example of a radiation imaging apparatus according to the first embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

In the present specification, radiation includes α-rays, β-rays and γ-rays, which are beams produced by particles (including photons) emitted by radioactive decay, as well as beams having energies equal to or higher than these, e.g., X-rays, particle rays, cosmic rays, and the like.

First Embodiment

A configuration example of a radiation imaging system according to the first embodiment will be described with reference to the block diagram of FIG. 1. The radiation imaging system includes, for example, a radiation generating apparatus 10, a radiation control apparatus 20, a computer 30, and a radiation imaging apparatus 40. The radiation generating apparatus 10 generates radiation and irradiates the radiation toward the radiation imaging apparatus 40. The radiation control apparatus 20 controls the start and stop of irradiation of radiation by the radiation generating apparatus 10. The radiation imaging apparatus 40 generates a radiation image that includes information of a subject arranged between the radiation generating apparatus 10 and the radiation imaging apparatus 40, and transmits the radiation image to the computer 30. The computer 30 controls the display of a radiation image and the operation of the radiation imaging apparatus 40.

The radiation imaging apparatus 40 includes, for example, a two-dimensional detector 41, a bias power supply 42, a processing unit 43, and a drive control unit 44. The two-dimensional detector 41 generates a radiation image based on radiation that includes information of a subject. The bias power supply 42 supplies a bias voltage to the two-dimensional detector 41, and supplies information (current information) about a current flowing through a bias line of the two-dimensional detector 41 to the processing unit 43. Based on the current information from the bias power supply 42, the processing unit 43 generates information on whether the radiation imaging apparatus 40 is being irradiated with radiation (hereinafter referred to as radiation information), and supplies the radiation information to the drive control unit 44. The processing unit 43 may be configured by a digital signal processing circuit that includes a processor such as an FPGA or a DSP, or may be configured by an analog circuit such as a sample-and-hold circuit or an operational amplifier. The processing unit 43 may be included in the computer 30 instead of being included in the radiation imaging apparatus 40. The drive control unit 44 controls the driving of the two-dimensional detector 41. For example, the drive control unit 44 controls a drive timing of the radiation imaging apparatus 40 in accordance with an instruction from the computer 30.

An example of the overall configuration of the radiation imaging apparatus 40 will be described with reference to an equivalent circuit diagram of FIG. 2. The two-dimensional detector 41 includes a pixel array 101, a drive circuit (a driving unit) 102, and a readout circuit 103. In addition to the components illustrated in FIG. 1, the radiation imaging apparatus 40 includes a signal processing unit (a processor) 105 and a reference bias potential generation circuit 106.

The pixel array 101 has a plurality of pixels PIX arranged two-dimensionally to configure a plurality of rows and a plurality of columns. In the example illustrated in FIG. 2, the pixels PIX are arranged so as to configure 3 rows×3 columns, but in reality, more pixels PIX are arranged so as to configure more rows and columns. For example, a 17 inch radiation imaging apparatus has about 2800 rows×about 2800 columns of pixels. Each pixel PIX includes a conversion element 201 that converts radiation into an electric charge and a switch element T that outputs an electric signal corresponding to the electric charge to a signal line Sig, and each pixel PIX is configured to detect radiation. The switch element T of the pixel PIX connects the conversion element 201 of the pixel PIX to the signal line Sig arranged for the column that includes the pixel PIX.

The conversion element 201 may be, for example, an indirect type conversion element that includes a photoelectric conversion element S for converting light into electric charge and a wavelength converter (scintillator) for converting radiation into light of a wavelength detectable by the photoelectric conversion element. Alternatively, the conversion element 201 may be a direct type conversion element that directly converts radiation into electric charge. The photoelectric conversion element S may be, for example, a PIN photodiode whose main component is amorphous silicon arranged on an insulating substrate such as a glass substrate. When the photoelectric conversion element of the conversion element 201 is a PIN photodiode, the conversion element 201 may have a capacitor Cs. The conversion element 201 may be an MIS photodiode whose main component is amorphous silicon and that is arranged on an insulating substrate such as a glass substrate.

The switch element T may be a transistor having a control terminal and two main terminals, for example, a thin film transistor (TFT). One electrode of the conversion element 201 is electrically connected to one electrode of the two main terminals of the switch element T, and the other electrode of the conversion element 201 is electrically connected to a common bias line Vs. A bias potential is supplied to the bias line Vs from the bias power supply 42. That is, the bias line Vs is a conductive line for applying a bias potential to the conversion element 201 of the plurality of pixels PIX in the pixel array 101.

The control terminal (gate) of the switch element T is connected to a drive line G driven by the drive circuit 102. The radiation imaging apparatus 40 has a plurality of drive lines G, and one drive line G is arranged for each row of the pixel array 101. The drive circuit 102 supplies a drive signal to the control terminal of the switch element T of the pixel PIX. The drive signal includes two levels of voltage: an ON voltage that renders the switch element T conductive, and an OFF voltage that renders the switch element T non-conductive. By the drive circuit 102 supplying the ON voltage to the control terminal of the switch element T through the drive line G, a signal corresponding to the electric charge accumulated in the conversion element 201 of the pixel PIX of the selected row is output to the plurality of signal lines Sig in parallel.

The signal output to the signal line Sig is read out by the readout circuit 103. The readout circuit 103 includes a plurality of amplifying circuits 207 and a multiplexer 208. The plurality of amplifying circuits 207 are provided so that one amplifying circuit 207 corresponds to one signal line Sig. The signals of the pixels PIX in the selected row output in parallel to the plurality of signal lines Sig are amplified in parallel by the plurality of amplifying circuits 207.

Each amplifying circuit 207 may include, for example, an integrating amplifier 203, a variable amplifier 204 that amplifies a signal from the integrating amplifier 203, a sample-and-hold circuit 205 that samples and holds a signal from the variable amplifier 204, and a buffer amplifier 206. The integrating amplifier 203 may include, for example, an operational amplifier for amplifying a difference between a signal output to the signal line Sig and a reference potential Vref1 from the reference power supply 107, an integration capacitor, and a reset switch. The integrating amplifier 203 can change the amplification factor by changing the value of the integration capacitor. An inversion input terminal of the operational amplifier is supplied with the signal output to the signal line Sig, the non-inversion input terminal is supplied with the reference potential Vref1 from the reference power supply 107, and the output terminal is connected to the input terminal of the variable amplifier 204. The integration capacitor and the reset switch are connected in parallel between an inversion input terminal and an output terminal of the operational amplifier. The sample-and-hold circuit 205 may be configured by, for example, a sampling switch and a sampling capacitor.

The multiplexer 208 sequentially selects and outputs the signals read out in parallel from the plurality of amplifying circuits 207 respectively corresponding to the plurality of signal lines Sig. The readout circuit 103 may include a buffer amplifier 209 that buffers the signal from the multiplexer 208. The buffer amplifier 209 may function as an impedance converter. The readout circuit 103 may include an AD converter 210. The AD converter 210 may be arranged, for example, to convert an analog signal output from the buffer amplifier 209 into a digital signal.

The signal output from the readout circuit 103 can be provided to the signal processing unit 105. The signal processing unit 105 may be configured to process a signal output from the readout circuit 103 and supply the processed signal to the computer 30. The signal processing unit 105 may be incorporated in the radiation imaging apparatus 40 as illustrated in FIG. 2, or may be provided as a device external to the radiation imaging apparatus 40.

The drive control unit 44 controls the entire operation of the radiation imaging apparatus 40, and generates, for example, a control signal for controlling the drive circuit 102, a control signal for controlling the readout circuit 103, or the like. In FIG. 2, lines representing connections from the drive control unit 44 to respective circuits are omitted. In response to a control signal from the drive control unit 44, the drive circuit 102 makes the switch element T of the pixel PIX of the row from which the signal is to be read out conductive. The control signal for the drive control unit 44 to control the readout circuit 103 may include, for example, a reset signal RC, a sample-and-hold signal SH, and a clock signal CLK. The reset signal RC is a signal for controlling the reset switch of the integrating amplifier 203, the sample-and-hold signal SH is a signal for controlling the sample-and-hold circuit 205, and the clock signal CLK is a signal for controlling the multiplexer 208.

Figure 3:
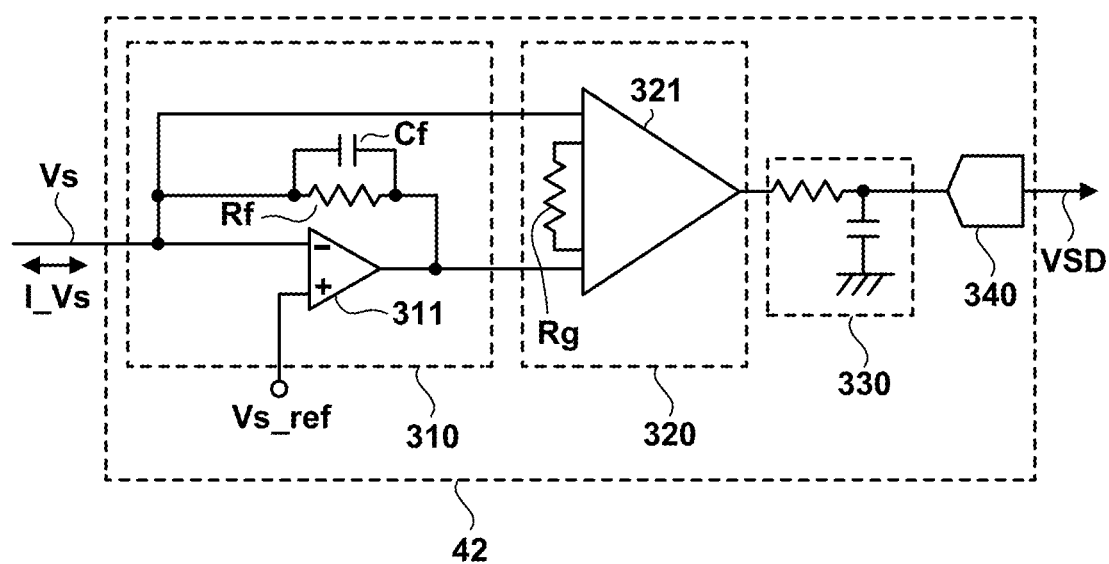
FIG. 3 is a diagram for describing a configuration example of a bias power supply according to the first embodiment.

The bias power supply 42 will be described with reference to the equivalent circuit diagram of FIG. 3. The bias power supply 42 detects a current flowing through the bias line Vs (hereinafter referred to as a bias current I_Vs), and provides a bias current signal VSD representing the current as current information to the processing unit 43. That is, the bias power supply 42 may function as an acquiring unit that acquires the bias current signal VSD. The bias power supply 42 may include, for example, a current-voltage conversion amplifier 310, a voltage amplifier 320, a filter circuit 330, and an AD converter 340. The current-voltage conversion amplifier 310 converts a current flowing through the bias line Vs into a voltage. The voltage amplifier 320 amplifies a signal (voltage signal) output from the current-voltage conversion amplifier 310. The filter circuit 330 is a filter that limits a band of a signal output from the voltage amplifier 320, and may be, for example, a low-pass filter. The AD converter 340 supplies the bias current signal VSD, which is obtained by converting a signal (analog signal value) output from the filter circuit 330 into a digital signal value, to the processing unit 43.

The bias power supply 42, more specifically the current-voltage conversion amplifier 310, detects a current flowing through the bias line Vs, and supplies a potential corresponding to the reference bias potential Vs_ref supplied from the reference bias potential generation circuit 106 to the bias line Vs. The current-voltage conversion amplifier 310 may be a transimpedance amplifier. The current-voltage conversion amplifier 310 includes, for example, an operational amplifier 311 and a feedback path arranged between an inversion input terminal (second input terminal) and an output terminal of the operational amplifier 311. A reference bias potential Vs_ref is applied to a non-inversion input terminal (first input terminal) of the operational amplifier 311. The feedback path may include, for example, a path for shorting the inversion input terminal and the output terminal of the operational amplifier 311 with a resistor Rf. A phase compensation capacitor Cf may be connected in parallel to the resistor Rf. The voltage amplifier 320 may include an instrumentation amplifier 321 and a gain setting resistor Rg.

Figure 4:
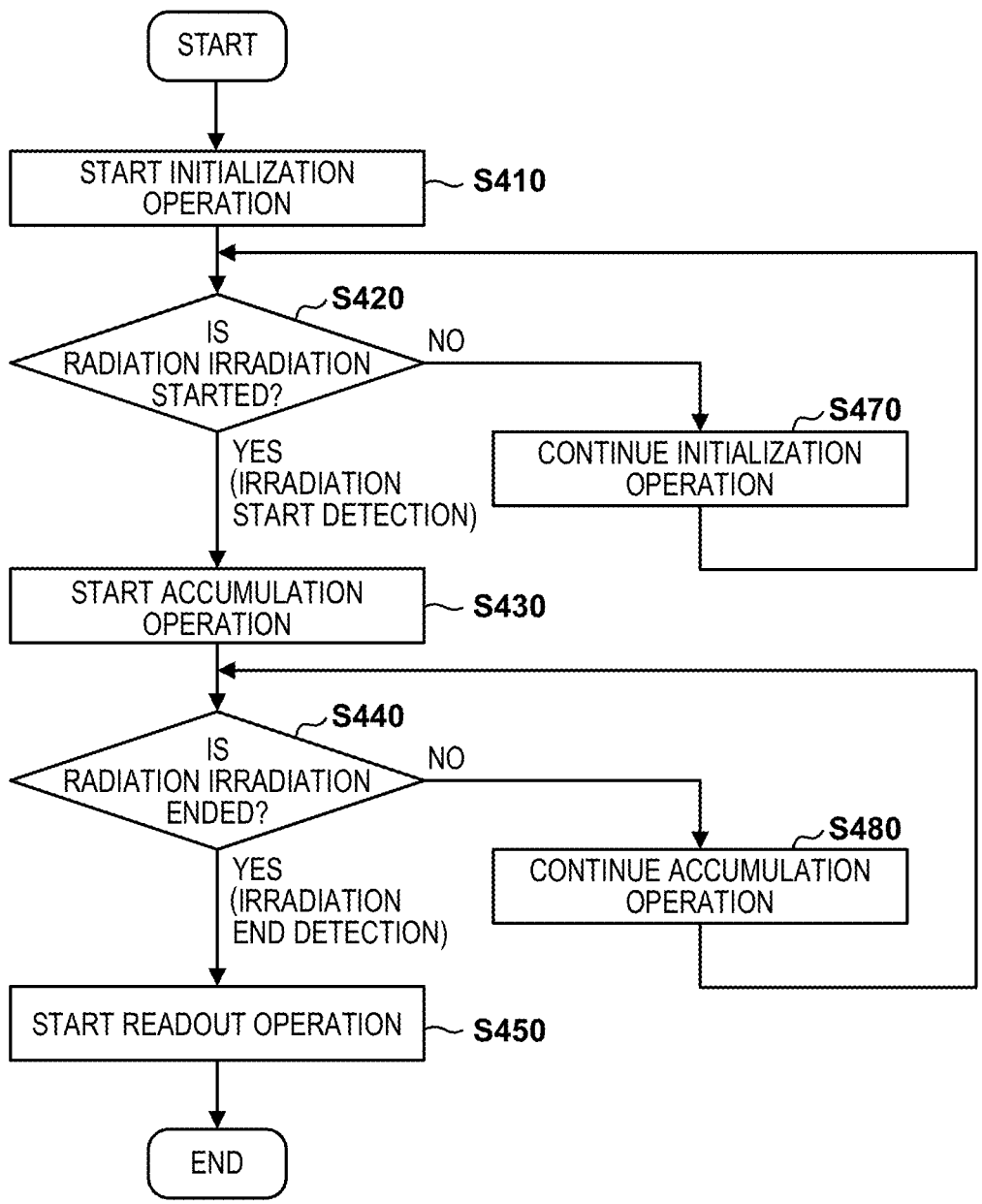
FIG. 4 is a flowchart for describing an operation example of a radiation imaging system according to a first embodiment.
Figure 5:
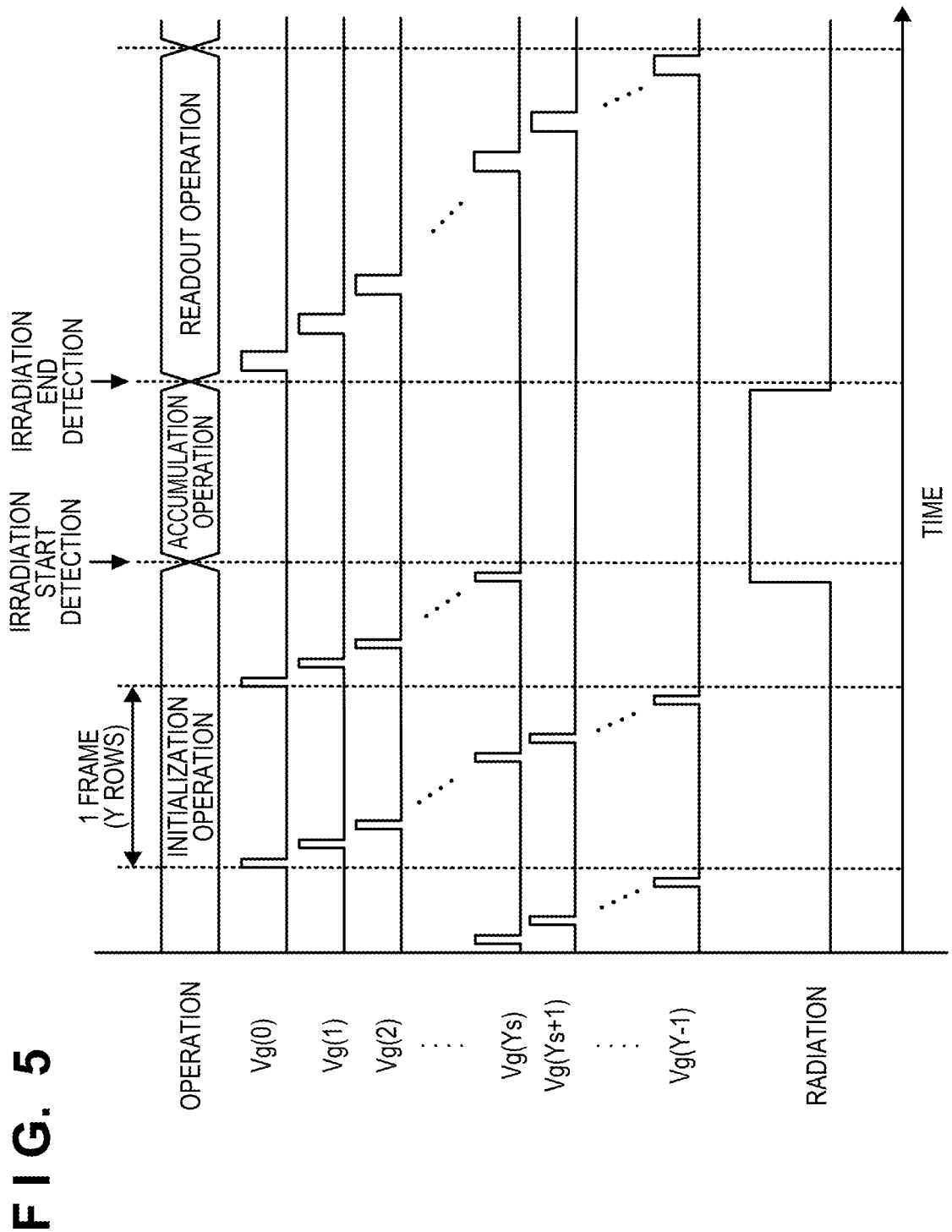
FIG. 5 is a timing chart for describing an operation example of a radiation imaging system according to a first embodiment.

The operation of the radiation imaging apparatus 40 will be described with reference to the flowchart of FIG. 4 and the timing chart of FIG. 5. The operation of the radiation imaging apparatus 40 includes an initialization operation, an accumulation operation, and a readout operation. The initialization operation is an operation of initializing a plurality of pixels PIX of the pixel array 101 in units of rows. The accumulation operation is an operation of accumulating electric charge generated by irradiation of radiation in each pixel PIX of the pixel array 101. The readout operation is an operation of reading out a signal corresponding to the electric charge accumulated in each pixel PIX of the pixel array 101 by irradiation of the pixel array 101 with radiation from the pixel array 101, and outputting the signal as an image (image signal).

There is a shift from the initialization operation to the accumulation operation in response to the processing unit 43 detecting the start of irradiation of the radiation with respect to the radiation imaging apparatus 40 based on the bias current signal VSD output from the bias power supply 42. There may be a shift from the accumulation operation to the readout operation, for example, in response to the elapsing of a predetermined amount of time from the start of the accumulation operation, or there may be a shift from the accumulation operation to the readout operation in response to the processing unit 43 detecting, based on the bias current signal VSD, the end of the irradiation of radiation with respect to the radiation imaging apparatus 40.

In step S410, the drive control unit 44 starts an initialization operation. In the initialization operation, the drive control unit 44 repeats the operation of cyclically supplying the ON voltage to the drive lines G from the first row to the last row and setting the reset signal RC to an active level. Here, when the reset signal RC is set to the active level, the integrating amplifier 203 enters a voltage-follower state, and the reference potential Vref1 is supplied to the signal line Sig. In this state, the switch T in the row for which the ON voltage is supplied to the drive line G becomes conductive, and the electric charge accumulated in the capacitor Cs of the conversion element 201 is initialized. For FIG. 4, Vg(0), Vg(1), Vg(2), . . . , Vg(Ys), Vg(Ys+1), . . . , Vg(Y−1) represent drive signals supplied to the drive line G of the first row of the pixel array 101 the last row. Y represents the number of rows of the pixel array 101, that is, the number of drive lines G. The numbers in parentheses represent the number of rows counted from one end of the pixel array 101. Let the first row be the 0th. In the following, the drive control unit 44, the operation of continuously supplying the ON voltage with respect to a certain drive line G (in other words, operation after switching the drive signal from the OFF voltage to the ON voltage, until to the OFF voltage is switched to again) is referred to as one initialization operation with respect to this drive line G. A period from the start of an initialization operation for a certain drive line G to the start of the next initialization operation for the drive line G is called a frame. In the example of FIG. 4, Y initialization operations are performed in one frame, and one row of pixels is initialized in one initialization operation.

In a period in which the initialization operation is repeatedly performed, the bias power supply 42 detects information correlated with the amount of irradiation of radiation with respect to the pixel array 101, and supplies a detection signal corresponding to this information to the processing unit 43. In the present embodiment, the bias power supply 42 detects the current I_Vs flowing through the bias line Vs as information correlated with the amount of irradiation of radiation with respect to the pixel array 101, and supplies the bias current signal VSD indicating the current to the processing unit 43 as a detection signal corresponding to the information.

During the initialization operation, in step S420, the processing unit 43 performs radiation detection processing. Specifically, the processing unit 43 calculates radiation information based on the bias current signal VSD, and determines, based on the radiation information, the start of radiation irradiation with respect to the pixel array 101. Although the present embodiment deals with the case where the processing unit 43 performs the detection processing once for each initialization operation, the processing unit 43 may perform the detection processing once for each of a plurality of initialization operations.

The drive control unit 44 continues to repeat the initialization operation until the start of the radiation irradiation with respect to the pixel array 101 is detected (step S470). When the drive control unit 44 detects the start of radiation irradiation with respect to the pixel array 101 (YES in step S420), the drive control unit 44 starts an accumulation operation in step S430. That is, when the drive control unit 44 detects the start of radiation irradiation (illustrated as "irradiation start detection" in FIG. 4), there is a shift from the initialization operation to an accumulation operation. In the example of FIG. 5, the initialization operation is stopped at the Ys-th row, and the process shifts to the accumulation operation. Details of the detection process in step S420 will be described later.

During the accumulation operation, the drive control unit 44 determines the end of the radiation irradiation in step S440. The method of determining the end of radiation is not particularly limited. For example, it can be determined that the radiation irradiation has been completed in accordance with the elapsing of the predetermined amount of time from the start of the accumulation operation. Instead, the drive control unit 44 can detect the end of radiation irradiation of the pixel array 101 based on the bias current signal VSD.

The drive control unit 44 continues the accumulation operation until it determines that the radiation irradiation with respect to the pixel array 101 has ended (step S480). When the drive control unit 44 determines that the radiation irradiation with respect to the pixel array 101 has ended (YES in step S440), the drive control unit 44 starts a readout operation in step S450. In other words, the drive control unit 44 determines that the radiation irradiation has ended (indicated as "irradiation end detection" in FIG. 4), and there is a shift from the accumulation operation to a readout operation. In the readout operation, signals are sequentially read out from the pixels in the first row to the pixels in the last row of the pixel array 101.

Figure 6:
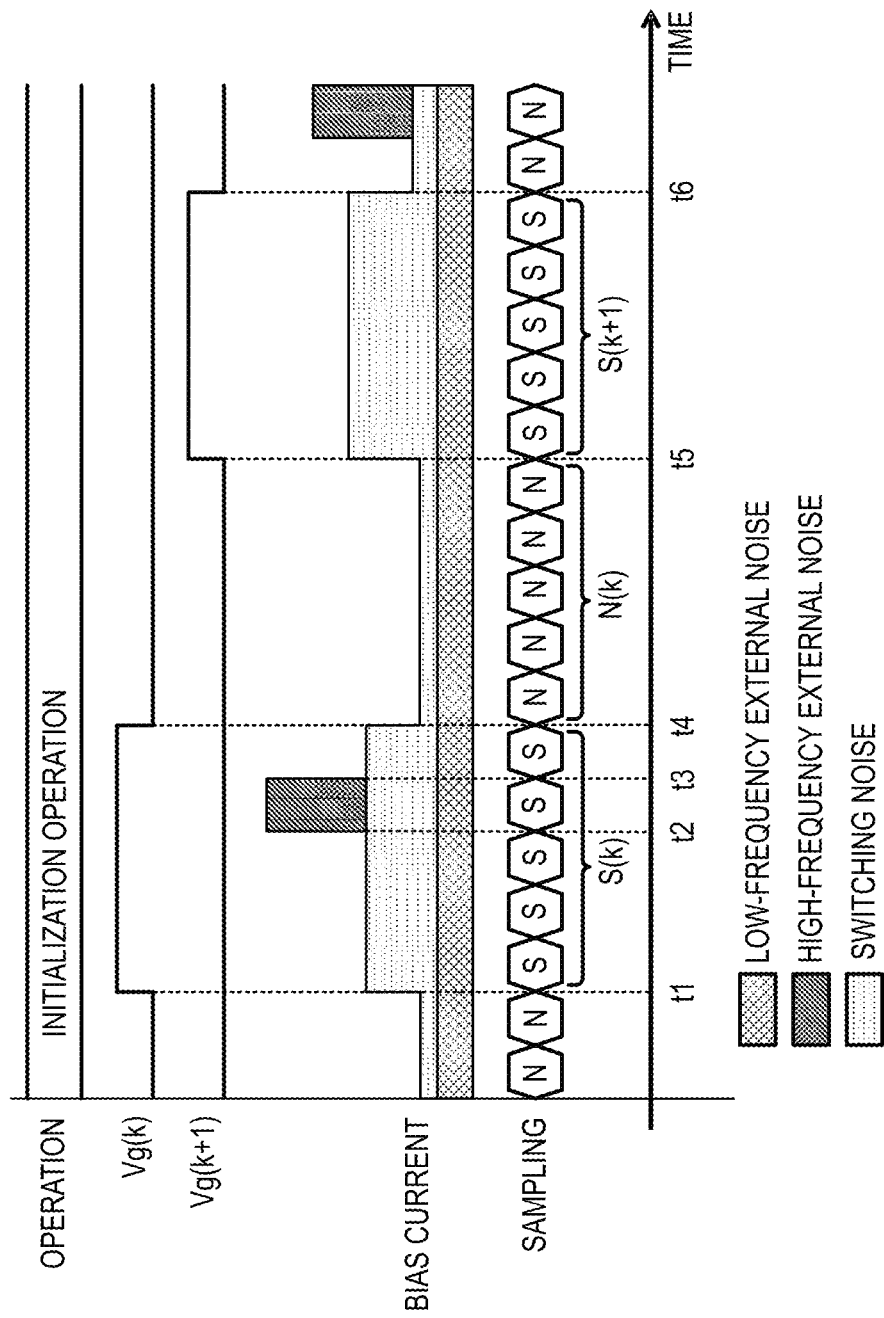
FIG. 6 is a timing chart for describing an operation example of the radiation imaging system according to the first embodiment.

With reference to the timing chart of FIG. 6, a detection method of the presence or absence of radiation irradiation will be described in detail. FIG. 6 is a diagram focusing on a part of a period in which the initialization operation described with reference to FIG. 5 is performed. In the period illustrated in FIG. 6, it is assumed that the radiation imaging apparatus 40 will not be irradiated with radiation. Therefore, the bias current does not include a component caused by radiation. The bias current includes a component caused by switching noise, a component caused by high-frequency external noise, and a component caused by low-frequency external noise. The switching noise is a current flowing through the bias line Vs by switching conduction/non-conduction of the switch element T. The low-frequency external noise is noise having a low frequency, such as noise mixed from a commercial power supply (50 Hz to 60 Hz) or noise that occurs when pressure or an impact is applied to the housing. The high-frequency external noise is noise having a high frequency generated by, for example, static electricity applied to the two-dimensional detector 41. For example, static electricity applied to the exterior of the radiation imaging apparatus 40 may be transmitted to the electric substrate via a battery or the like, and a large current/voltage variation may be generated in the bias power supply circuit. Since fluctuation of the current and the voltage due to the static electricity occurs in a pulse shape at a high frequency, as illustrated in FIG. 6, high-frequency external noise is generated in a period shorter than the switching cycle of the ON voltage and the OFF voltage.

The processing unit 43 acquires, for each of the plurality of drive lines G, a signal value representing a bias line current flowing through the bias line Vs during a period in which an ON voltage is continuously supplied to the drive line G. This signal value for the i-th ($0 \leq i \leq Y-1$) drive line G is represented by S(i). In the example of FIG. 6, the processing unit 43 acquires the signal value S(k) representing the bias line current from time t1 to time t4. In addition, the processing unit 43 acquires a signal value representing the bias line current in a period from the end of supplying the ON voltage to the i-th drive line G to the start of supplying the ON voltage to the i+1-th drive line G (in this period the ON voltage is not supplied to any of the drive lines G). This signal value acquired between S(i) and S(i+1) is denoted by N(i). In the example of FIG. 6, the processing unit 43 acquires the signal value N(k) representing the bias line current from time t4 to time t5. When the pixel array 101 is irradiated with radiation, the signal value S(i) includes a component caused by the radiation. Therefore, the processing unit 43 detects the presence or absence of radiation irradiation based on the signal value S(i). As described above, the signal value S(i) includes various noise components. Therefore, the processing unit 43 reduces the noise included in the signal value S(i) by the processing described below.

First, a process for reducing high-frequency external noise will be described. The processing unit 43 acquires a plurality of signal values by acquiring a signal value representing a bias current flowing through the bias line Vs at each of a plurality of times within a period in which an ON voltage is continuously supplied to at least one of the plurality of drive lines G. The processing unit 43 specifies an outlier in the plurality of obtained signal values. Thereafter, the processing unit 43 determines whether or not there is radiation irradiation with respect to the pixel array 101 based on signal values other than the outlier, and without being based the signal value specified as the outlier from among the plurality of signal values.

Hereinafter, the above processing will be described in detail. The processing unit 43 acquires the value of the bias current signal VSD at each of a plurality of times (five times in the example of FIG. 6) in the period (times t1 to t2 in FIG. 6) in which the ON voltage is continuously supplied to the k-th drive line G. Hereinafter, these five values are represented as signal values s(0) to s(4). A period in which an ON voltage is continuously supplied to one drive line G is referred to as an ON period. The number of times at which the value of the bias current signal VSD is acquired in one ON period is not limited to 5, and may be another number thereof.

An amount of time during which the high-frequency external noise is applied (time t2 to time t3 in the example in the figure) is shorter than one ON period. Therefore, when the difference between the signal value S(k) and the signal value N(k) is taken, the low-frequency external noise can be reduced, but such high-frequency external noise cannot be reduced. Therefore, there is a possibility that erroneous detection of radiation irradiation occurs.

The signal value s(3) is acquired with respect to the time t2 to time t3 during which the high-frequency external noise occurs. The signal value s(3) is statistically significantly larger than the other signal values s(0) to s(2) and s(4). Therefore, the processing unit 43 specifies the signal value s(3) as an outlier. Outlier is a statistical term and are values that deviate significantly from other values.

In one example, the processing unit 43 specifies a signal value s(3) which is not included in the reference range among the plurality of signal values s(0) to s(4) as an outlier. Since the external noise may have a negative polarity, the reference range may have a lower limit value as well as an upper limit value. In this case, the processing unit 43 specifies a signal value not included in the range of the upper limit value or less and the lower limit value or more as an outlier.

The reference range may be statistically determined based on a plurality of signal values s(0) to s(4). For example, if the average value of the plurality of signal values s(0) to s(4) is $\mu$ and the standard deviation is $\sigma$, the reference range may be a range of $\mu-3\sigma$ or more and $\mu+3\sigma$ or less in accordance with the $3\sigma$ method. Alternatively, the processing unit 43 may set $3\sigma$ to another multiple of the standard deviation. Further, the processing unit 43 may specify an outlier using other methods such as outlier testing. The reference range may be determined in advance without being based on the plurality of signal values s(0) to s(4).

After specifying the outlier, the processing unit 43 calculates the signal value S(k) based on the signal values s(0) to s(2) and s(4) and not the signal value s(3) which was specified as the outlier. For example, the processing unit 43 may use the arithmetic mean (i.e., {s(0)+s(1)+s(2)+s(4)}/4) of these signal values s(0) to s(2) and s(4) as the signal value S(k). When the signal values s(0) to s(4) do not include an outlier, the processing unit 43 sets the arithmetic mean of the signal values s(0) to s(4) as the signal value S(k). In this manner, by making S(k) with the same arithmetic processing regardless of whether or not there is an outlier, the influence on comparing S(k) included in different frames together is reduced. In other words, in the present embodiment, the processing unit 43 performs arithmetic processing, which would be applied to the plurality of signal values when the plurality of signal values s(0) to s(4) do not include an outlier, on the signal values s(0) to s(2) and s(4) which are not outliers among the plurality of signal values s(0) to s(4). The processing unit 43 thereby generates information S(k) for determining whether or not there is radiation irradiation with respect to the pixel array 101.

In the processing described above, the processing unit 43 excludes outliers in the plurality of signal values s(0) to s(4) for generating the signal value S(k). The processing unit 43 may perform similar processing for the generation of the signal value N(k). More specifically, the processing unit 43 acquires a plurality of second signal values by acquiring signal values n(0) to n(4) representing currents flowing through the bias lines at a plurality of times within a period in which the ON voltage is not being continuously supplied to any of the plurality of drive lines G. The processing unit 43 specifies an outlier of the plurality of signal values n(0) to n(4). Thereafter, the processing unit 43 calculates the signal value N(k) based on the signal values that are not an outlier and not based on the signal value specified as the outlier, from among the plurality of signal values n(0) to n(4). As described below, the signal value N(k) is also information used to determine whether or not there is radiation irradiation with respect to the pixel array 101.

In the above description, the reference range is calculated based on the signal values s(0) to s(4) in one ON period. Alternatively, the reference range may be a preset value based on a bias current acquired in a state where high-frequency external noise is not being applied, or may be calculated using data of n frames prior (n is an arbitrary natural number). Instead of the average value of the signal values s(0) to s(4), one of the values of the bias current n frames ago may be used. When specifying an outlier that is due to high-frequency external noise such as static electricity, the processing unit 43 does not need to use data of the same pixel row, and may use the value of the bias current of any other pixel row in the same frame or n frames prior. In addition, the processing unit 43 does not need to calculate parameters such as an average value and a standard deviation for statistically setting the reference range from the same frame and the data of the same pixel row, and, for each parameter, may make a calculation from data of different frames or different pixel rows.

Next, a process for reducing low-frequency external noise will be described. Low-frequency external noise has little temporal variation, and thus is reduced by taking the difference between the signal value S(k) and the signal value N(k) acquired at a close time. Therefore, the processing unit 43 reduces the low-frequency external noise according to any of the following equations. The signal value X1(k) represents a radiation signal with reduced low frequency external noise.

$$X1(k)=S(k)-N(k)$$

$$X1(k)=S(k)-N(k-1)$$

$$X1(k)=S(k)-\{N(k)+N(k-1)\}/2$$

Instead of the above equation, the processing unit 43 may use a signal value for a non-adjacent drive line G such as S(k−1) or N(k−2) to calculate X(k), or may perform other arithmetic processing (basic arithmetic operations or calculus).

Next, a process for reducing switching noise will be described. The amount of switching noise differs depending on whether the drive signal supplied to the switch element T is an ON voltage or an OFF voltage, and also differs depending on which drive line G the drive signal is supplied to. In contrast, the temporal variation of the switching noise is small. Therefore, the processing unit 43 reduces the switching noise by subtracting X1(k) obtained one frame before from the X1(k) described above. Specifically, the processing unit 43 reduces the switching noise according to the following equation. The signal value X2(k) represents a radiation signal with reduced switching noise.

$$X2(k)=X1(k)-(X1(k) \text{ from one frame before})$$

In X2(k) obtained in this manner, all of high-frequency external noise, low-frequency external noise, and switching noise are reduced. The processing unit 43 compares X2(k) with a predetermined threshold value to thereby determine whether or not the pixel array 101 is being irradiated with radiation.

Depending on the response speed of the current-voltage conversion amplifier 310, there are cases where the delay from the switching of the conductive state of the switch element T until the bias current changes cannot be ignored. In such a case, the processing unit 43 may shift the amount of time to start sampling s(0) from the conduction of the switch element T. In addition, a signal due to radiation is not sufficiently output in a duration from after the drive signal changes to the ON voltage and until the switch element T is switched to the conductive state. Therefore, the processing unit 43 may ignore the signal value of such a section. It is similar for the acquisition of the signal value N(k).

If the sample-and-hold timing of the AD converter 340 is not constant, a shift may occur in the sampling position of the switching noise waveform. Therefore, noise may occur when the difference between the signal value S(k) and the signal value N(k) of different frames is taken. In particular, when the switching noise is large compared to the radiation signal, large noise can occur with even slight position deviation. Therefore, the amount of time between the timing of switching the conduction/non-conduction of the switch element T and the sample-and-hold timing of the AD converter 340 may be synchronized. Specifically, the drive control unit 44 may generate timings for switching the conduction/non-conduction of the switch element T from a common clock, and a sample-and-hold timing of the AD converter 340.

Second Embodiment

A radiation imaging system according to the second embodiment will be described. The second embodiment differs from the first embodiment in the method of calculating the signal value S(k) and the signal value N(k). Other points may be similar, and thus duplicate descriptions will be omitted. Since the method of calculating the signal value N(k) may be similar to the method of calculating the signal value S(k), the method of calculating the signal value S(k) will be described below.

As in the first embodiment, it is assumed that the signal value s(3) among the plurality of signal values s(0) to s(4) is specified as an outlier. In the first embodiment, the calculated average of the signal values s(0) to s(2) and s(4) other than the outlier is the signal value S(k). Instead, in the second embodiment, after replacing the signal value s(k) specified as the outlier with another value s_sub, the arithmetic processing is performed on the assumption that there is no outlier. For example, the processing unit 43 may use the arithmetic mean (i.e., {s(0)+s(1)+s(2)+s(4)+s_sub}/5) of these signal values s(0) to s(2) and s(4) and s_sub as the signal value S(k). When the signal values s(0) to s(4) do not include an outlier, the processing unit 43 sets the arithmetic mean of the signal values s(0) to s(4) as the signal value S(k). In this manner, by making S(k) with the same arithmetic processing regardless of whether or not there is an outlier, the influence on comparing S(k) included in different frames together is reduced. In other words, in the present embodiment, the processing unit 43 performs arithmetic processing, which would be applied to the plurality of signal values when the plurality of signal values s(0) to s(4) do not include an outlier, on the plurality of signal values s(0) to s(4) after the signal value s(3) which is specified as an outlier is replaced with another value: s_sub. The processing unit 43 thereby generates information S(k) for determining whether or not there is radiation irradiation with respect to the pixel array 101.

s_sub may be the value of s(3) obtained n frames ago (n is an arbitrary natural number) (i.e., the signal value acquired fourth in the ON period of the k-th row). Alternatively, the value of s(k) acquired n frames before (n is an arbitrary natural number) may be used. Alternatively, s_sub may be an arithmetic mean (i.e., {s(0)+s(1)+s(2)+s(4)}/4) of the signal values (or some signal values) specified as not being an outlier of the plurality of signal values s(0) to s(4)).

s_sub may be a value set in advance without being based on the plurality of signal values s(0) to s(4). For example, the value may be set in advance based on current data acquired in a state where high-frequency external noise is not applied. When a plurality of signal values are specified as outliers, the same value s_sub may be used for each signal value, or different values may be used for respective signal values.

Third Embodiment

A radiation imaging system according to the third embodiment will be described. The third embodiment differs from the first embodiment in the method of specifying an outlier in a plurality of signal values s(0) to s(4). Other points may be similar, and thus duplicate descriptions will be omitted. Since the method of specifying an outlier in the plurality of signal values n(0) to n(4) may be similar to the method of specifying an outlier in the plurality of signal values s(0) to s(4), the method of specifying an outlier in the plurality of signal values s(0) to s(4) will be described below.

In the first embodiment and the second embodiment, the processing unit 43 specifies an outlier based on the signal values s(0) to s(4). In the third embodiment, the processing unit 43 specifies an outlier in the signal values s(0) to s(4) based on the amount of change in the signal values s(0) to s(4).

The irradiation time of the radiation is usually longer than an ON period of the drive signal. Therefore, the plurality of signal values s(0) to s(4) acquired in one ON period greatly change only once at the start and end of irradiation of radiation. In contrast to this, since the width of the high-frequency external noise is shorter than the ON period of the drive signal, when noise occurs, a plurality of signal values s(0) to s(4) acquired in one ON period change greatly twice.

Therefore, the processing unit 43 determines whether or not amounts of change s'(i)=s(i)−s(i−1) of the plurality of signal values s(0) to s(4) are included in the reference range in one ON period. When an amount of change exceeds one of the upper limit value and the lower limit value of the reference range, and a subsequent amount of change exceeds the other of the upper limit value and the lower limit value, the processing unit 43 specifies a signal value therebetween as an outlier. For example, when the amount of change from s(2) to s(3) exceeds the upper limit value and the amount of change from s(3) to s(4) exceeds the lower limit value, the processing unit 43 specifies the signal value s(3) as an outlier. A method of setting the reference range of the amount of change of a signal value in order to specify the outlier may be similar to the method of setting the reference range of a signal value of the first embodiment, and therefore, duplicated description is omitted.

When high-frequency external noise is applied immediately before the start or just before the end of an ON period, there is a possibility that a large change in the signal value occurs in one ON period only once. Therefore, the processing unit 43 may specify a signal value as an outlier even when only one large change occurs immediately after the start or just before the end of the ON period.

Fourth Embodiment

A radiation imaging system according to the fourth embodiment will be described. The fourth embodiment differs from the first embodiment in the method of specifying an outlier in a plurality of signal values s(0) to s(4). Other points may be similar, and thus duplicate descriptions will be omitted. Since the method of specifying an outlier in the plurality of signal values n(0) to n(4) may be similar to the method of specifying an outlier in the plurality of signal values s(0) to s(4), the method of specifying an outlier in the plurality of signal values s(0) to s(4) will be described below.

Figure 7:
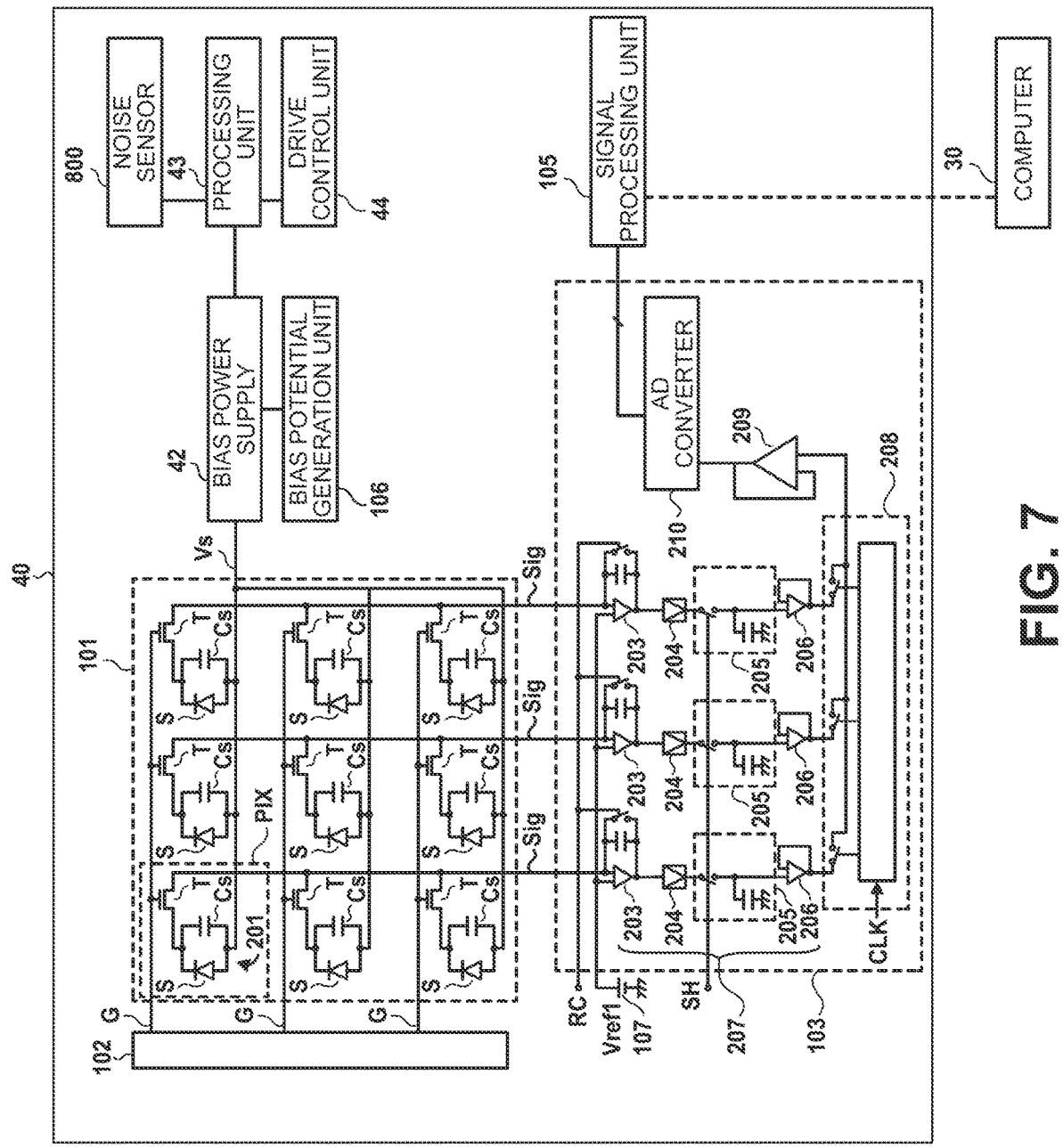
FIG. 7 is a diagram for describing a configuration example of a radiation imaging apparatus according to a fourth embodiment.

As illustrated in FIG. 7, the radiation imaging apparatus 40 according to the present embodiment further includes a noise sensor 800. The noise sensor 800 is an electric field sensor for detecting noise due to static electricity, for example, and is connected to the processing unit 43. The processing unit 43 uses the noise sensor 800 to detect noise generated in the radiation imaging apparatus 40.

The processing unit 43 acquires a plurality of signal values e(0) to e(4) from the noise sensor 800 in synchronization with acquisition of the plurality of signal values s(0) to s(4). The plurality of signal values e(0) to e(4) have similar noise to high-frequency external noise included in the plurality of signal values s(0) to s(4). Accordingly, the processing unit 43 specifies an outlier of the plurality of signal values n(0) to n(4). Thereafter, the processing unit 43 specifies, as an outlier, the signal value s(3) corresponding to the signal value e(3) which has been specified as an outlier from among the plurality of third signal values e(0) to e(4). The signal value s(3) corresponding to the signal value e(3) is the signal value s(3) acquired in synchronization with the signal value e(3). A method of setting the reference range of the signal values e(0) to e(4) in order to specify the outlier may be similar to the method of setting the reference range of the signal values s(0) to s(4) of the first embodiment, and therefore, duplicated description is omitted.

Fifth Embodiment

A radiation imaging system according to the fifth embodiment will be described. The fifth embodiment differs from the first embodiment in the method of specifying an outlier in a plurality of signal values s(0) to s(4). Other points may be similar, and thus duplicate descriptions will be omitted. Since the method of specifying an outlier in the plurality of signal values n(0) to n(4) may be similar to the method of specifying an outlier in the plurality of signal values s(0) to s(4), the method of specifying an outlier in the plurality of signal values s(0) to s(4) will be described below.

In the first embodiment, the processing unit 43 specifies a signal value not included in the reference range as an outlier. In the present embodiment, the processing unit 43 specifies a predetermined number or a predetermined ratio of signal values among the plurality of signal values s(0) to s(4) acquired in one ON period as outliers.

For example, the sampling frequency of the signal value S(k) and the signal value N(k) is a Hz (about several MHz), and the envisioned frequency of high-frequency external noise is b Hz (several MHz to several GHz). In this case, the processing unit 43 calculates a number X of signal values specified as outliers among the plurality of signal values according to the following equation.

$$X = \max\{1, [a/b]\}$$

Where max{ } is a function that represents the larger of supplied arguments and [ ] is the floor function. Alternatively, the number X may be a preset value.

The assumed frequency of the high-frequency external noise may be set in advance, or may be calculated based on data output from the noise sensor 800. The processing unit 43 specifies the number of signal values determined in this manner as outliers in descending order of distance from the average value.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-068563, filed Mar. 29, 2019 which is hereby incorporated by reference herein in its entirety.

What is claimed is:

1. A radiation imaging apparatus, comprising:
a signal line;
a pixel array comprising a plurality of pixels arranged to configure a plurality of rows and a plurality of columns, each pixel of the plurality of pixels including (i) a conversion element configured to convert radiation into an electric charge, and (ii) a switch element for connecting the conversion element to the signal line;
a bias line configured to apply a bias potential to each conversion element of the plurality of pixels;
a plurality of drive lines for respectively configured to supply an ON voltage for turning on each switch element of the plurality of pixels to a control terminal of each switch element of the plurality of pixels;
a driving unit configured to cyclically supply the ON voltage to the plurality of drive lines;
an acquiring unit configured to acquire a plurality of signal values by acquiring a signal value representing a current flowing through the bias line at each of a plurality of times within a period in which the ON voltage is continuously supplied to at least one of the plurality of drive lines; and
a processing unit configured to specify an outlier in the plurality of signal values, and to determine whether or not there is a radiation irradiation with respect to the pixel array based on a signal value among the plurality of signal values that is not the outlier without being based on the signal value specified as the outlier among the plurality of signal values.

2. The radiation imaging apparatus according to claim 1, wherein the plurality of signal values are a plurality of first signal values,
the driving unit is configured to supply the ON voltage to one or more drive lines of the plurality of drive lines, and then supplies the ON voltage to another one or more drive lines of the plurality of drive lines in a time period,
the acquiring unit is configured to acquire a plurality of second signal values by acquiring a second signal value representing a current flowing through the bias line at each of a plurality of times not within the period in which the ON voltage is continuously supplied to at least one of the plurality of drive lines, and
the processing unit is configured to specify an outlier in the plurality of second signal values, and to determine whether or not there is a radiation irradiation with respect to the pixel array also based on a second signal value among the plurality of second signal values that is not the outlier without being based on the second signal value specified as the outlier among the plurality of second signal values.

3. The radiation imaging apparatus according to claim 1, wherein the processing unit is configured to specify the signal value among the plurality of signal values that is not included in a reference range as the outlier in the plurality of signal values.

4. The radiation imaging apparatus according to claim 3, wherein the processing unit is configured to determine the reference range based on the plurality of signal values.

5. The radiation imaging apparatus according to claim 1, wherein the processing unit is configured to specify the outlier in the plurality of signal values based on an amount of change of the plurality of signal values.

6. The radiation imaging apparatus according to claim 1, wherein the processing unit is configured to specify a predetermined number or a predetermined ratio of the plurality of signal values as outliers in the plurality of signal values.

7. The radiation imaging apparatus according to claim 1, wherein the processing unit is configured to generate information for determining a presence or an absence of a radiation irradiation with respect to the pixel array by performing arithmetic processing, which is performed on the plurality of signal values when the plurality of signal values do not include the outlier, or on a signal value from the plurality of signal values that is not the outlier.

8. The radiation imaging apparatus according to claim 7, wherein the arithmetic processing includes an arithmetic mean.

9. The radiation imaging apparatus according to claim 1, wherein the processing unit is configured to generate information for determining a presence or an absence of a radiation irradiation with respect to the pixel array by performing arithmetic processing, which is performed on the plurality of signal values when the plurality of signal values do not include the outlier, after a signal value specified as the outlier is replaced with another signal value.

10. The radiation imaging apparatus according to claim 1, further comprising a sensor configured to detect a noise, wherein
the plurality of signal values are a plurality of first signal values,
the acquiring unit is further configured to acquire a plurality of third signal values from the sensor in a synchronization with an acquisition of the plurality of first signal values, and
the processing unit is further configured to specify an outlier in the plurality of third signal values, and to specify as the outlier a first signal value of the plurality of first signal values corresponding to a third signal value of the plurality of third signal values specified as the outlier in the plurality of third signal values.

11. A radiation imaging system, comprising:
a radiation imaging apparatus according to claim 1; and
a processor configured to process a signal output from the radiation imaging apparatus.

12. A method of controlling a radiation imaging apparatus, the radiation imaging apparatus comprising:
a signal line;
a pixel array comprising a plurality of pixels arranged to configure a plurality of rows and a plurality of columns, each pixel of the plurality of pixels including (i) a conversion element configured to convert radiation into an electric charge, and (ii) a switch element for connecting the conversion element to the signal line;
a bias line configured to apply a bias potential to each conversion element of the plurality of pixels;
a plurality of drive lines for respectively configured to supply an ON voltage for turning on each switch element of the plurality of pixels to a control terminal of each switch element of the plurality of pixels; and
a driving unit configured to cyclically supply the ON voltage to the plurality of drive lines; and
the method comprising the steps of:
acquiring a plurality of signal values by acquiring a signal value representing a current flowing through the bias line at each of a plurality of times within a period in which the ON voltage is continuously supplied to at least one of the plurality of drive lines; and
specifying an outlier in the plurality of signal values, and determining whether or not there is a radiation irradiation with respect to the pixel array based on a signal value among the plurality of signal values that is not the outlier without being based on the signal value specified as the outlier among the plurality of signal values.

\* \* \* \* \*